(12) United States Patent
Zhou et al.

(10) Patent No.: US 10,568,131 B2
(45) Date of Patent: Feb. 18, 2020

(54) SINGLE USER SWITCHING TIMER PER ACCESS CATEGORY (AC)

(71) Applicant: QUALCOMM Incorporated, San Diego, CA (US)

(72) Inventors: Yan Zhou, San Diego, CA (US); Alfred Asterjadhi, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/711,846

(22) Filed: Sep. 21, 2017

(65) Prior Publication Data

US 2018/0110069 A1   Apr. 19, 2018

Related U.S. Application Data

(60) Provisional application No. 62/409,856, filed on Oct. 18, 2016, provisional application No. 62/409,249, filed on Oct. 17, 2016.

(51) Int. Cl.
*H04W 72/08* (2009.01)
*H04W 74/00* (2009.01)
*H04W 74/08* (2009.01)
*H04L 25/02* (2006.01)
*H04W 84/12* (2009.01)
*H04B 7/0452* (2017.01)
*H04W 24/08* (2009.01)

(52) U.S. Cl.
CPC ....... *H04W 74/006* (2013.01); *H04L 25/0204* (2013.01); *H04W 74/0816* (2013.01); *H04W 74/0875* (2013.01); *H04W 74/0891* (2013.01); *H04B 7/0452* (2013.01); *H04W 24/08* (2013.01); *H04W 84/12* (2013.01)

(58) Field of Classification Search
CPC ........... H04W 72/1268; H04W 74/006; H04W 72/08
See application file for complete search history.

(56) References Cited

U.S. PATENT DOCUMENTS 9,232,543 B2   1/2016   Zhu
9,320,048 B2   4/2016   Liu et al.
(Continued)

OTHER PUBLICATIONS

Laurent Cariou et al: "2 sets of EDCA parameters", Sep. 12, 2016 (Sep. 12, 2016), XP055429248, IEEE 802.11 Mentor Public Documentation Portal.*

(Continued)

*Primary Examiner* — Myron Wyche
(74) *Attorney, Agent, or Firm* — Patterson & Sheridan, L.L.P.

(57) ABSTRACT

Certain aspects of the present disclosure relate to timers used to control switching from SU to MU transmission modes. In some examples, a frame is generated having an indication of multiple timer values for one or more wireless devices to be used for switching from a multiple user (MU) mode to a single user (SU) mode. In other examples, when to switch from a MU mode to a SU mode is determined based on multiple timer values obtained from a frame, and one or more second frames are generated for transmission via the SU mode or the MU mode based on the determination.

30 Claims, 7 Drawing Sheets

(56) References Cited

U.S. PATENT DOCUMENTS

| | | | |
|---|---|---|---|
| 9,332,571 | B2 | 5/2016 | Zhu et al. |
| 2016/0088602 | A1* | 3/2016 | Seok ............... H04L 5/0055 370/338 |
| 2016/0309508 | A1* | 10/2016 | Li ..................... H04W 74/006 |
| 2016/0374112 | A1 | 12/2016 | Asterjadhi et al. |
| 2017/0111924 | A1* | 4/2017 | Josiam ............. H04W 24/10 |
| 2017/0302510 | A1* | 10/2017 | Yang ................. H04B 7/04 |

OTHER PUBLICATIONS

Jing Ma: "Consideration on backoff procedure for UL MU transmission", vol. 802.11ax, No. 2, May 18, 2016 (May 18, 2016), pp. 1-6.*

Laurent Cariou et al; "2 sets of EDCA parameters", Sep. 12, 2016 (Sep. 12, 2016), XP)55429248, IEEE 802.11 Mentor Public Documentation Portal.*

Kosek-Szott K., "Improving DL-MU-MIMO Performance in IEEE 802.11ac Networks through Decoupled Scheduling", Manuscript accepted for publication in Springer Wireless Networks, Networking and Internet Architecture, Apr. 27, 2017, pp. 1-20.

Cariou L., et al., "2 Sets of EDCA Parameters", Sep. 12, 2016, XP055429248, IEEE 802.11 Mentor Public Documentation Portal Retrieved from the Internet: URL:https://mentor.ieee.org/802.11/dcn/16/11-16-0998-03-00ax-rules-for-2-edca-parameters.pptx [retrieved on Nov. 27, 2017], 32 pages.

International Search Report and Written Opinion—PCT/US2017/052985—ISA/EPO—dated Mar. 22, 2018.

Kneckt J., et al., "Power Save Discussion", IEEE Draft; 11-14-1454-00-00AX-Power-Save-Discussion, IEEE-SA Mentor, Piscataway, NJ, USA, vol. 802.11ax, Nov. 3, 2014 (Nov. 3, 2014), pp. 1-19, XP068118082, Retrieved from the Internet: URL: https://mentor.ieee.org/802.11/dcn/14/11-14-1454-00-00ax-power-save-discussion.pptx [retrieved on Nov. 3, 2014].

Ma J., et al.,"Consideration on Backoff Procedure for UL MU Transmission", IEEE Draft; 11-16-0664-02-00AX-Consideration-On-Backoff-Procedure-For-UL-MU-Transmission, IEEE SA Mentor, Piscataway, NJ, USA, vol. 802.11ax, No. 2, May 18, 2016 (May 18, 2016), pp. 1-6, XP068119546, Retrieved from the Internet: URL: https://mentor.ieee.org/802.11/dcn/16/11-16-0664-02-00ax-consideration-on-backoff-procedure-for-ul-mu-transmission.pptx [retrieved on May 18, 2016].

Park J., et al., "UL MU Transmission Rules-EDCA Backoff; 11-16-0880-02-00ax-ul-mu-transmission-rules-edca-backoff", IEEE Draft; 11-16-0880-02-00AX-UL-MU-Transmission-Rules-EDCA-Backoff, IEEE-SA Mentor, Piscataway, NJ, USA, vol. 802.11ax, No. 2, Jul. 26, 2016 (Jul. 26, 2016), pp. 1-21, XP068107165, Retrieved from the Internet: URL: https://mentor.ieee.org/802.11/dcn/16/11-16-0880-02-00ax-ul-mu-transmission-rules-edca-backoff.pptx [retrieved on Jul. 26, 2016].

Cariou L., et al., "Proposed Text Changes for MU EDCA Parameters", Sep. 13, 2016, XP055429095, IEEE 802.11 Mentor Public Documentation Portal, Retrieved from the Internet: URL: https://mentor.ieee.org/802.11/dcn/16/11-16-1180-01-00ax-proposed-text-changes-for-mu-edca-parameters.docx [retrieved on Nov. 27, 2017], 7 pages.

Jinsoo Ahn (Yonsei Univ): "MU Mode EDCA Control; 11-16-1220-01-00ax-mu-mode-edca-control", IEEE Draft; IEEE-SA Mentor, Piscataway, NJ USA, vol. 802.11ax, No. 1, Sep. 14, 2016, pp. 1-10, XP068107661, Retrieved from the Internet: URL:https://mentor.ieee.org/802.11/dcn/16/11-16-1220-01-00ax-mu-mode-edca-control.pptx [retrieved on Sep. 14, 2016].

John Son ( Wilus): "HE Trigger Frame Format", IEEE 802.11-15/0851r0, Jul. 13, 2015, pp. 1-10, XP055364960, Retrieved from the Internet: URL:https://mentor.ieee.org/802.11/dcn/15/11-15-0851-00-00ax-he-trigger-frame-format.pptx [retrieved on Apr. 18, 2017], 10 pages.

Partial International Search Report—PCT/US2017/052985—ISA/EPA—dated Dec. 5, 2017.

* cited by examiner

SINGLE USER SWITCHING TIMER PER ACCESS CATEGORY (AC)

CLAIM OF PRIORITY UNDER 35 U.S.C. § 119

This application claims priority to and the benefit of U.S. Provisional Application Ser. No. 62/409,856, entitled "Single User Switching Timer Per Access Category (AC)," filed Oct. 18, 2016, and claims priority to and the benefit of U.S. Provisional Application Ser. No. 62/409,249, entitled "Single User Switching Timer Per Access Category (AC)," filed Oct. 17, 2016; which applications are incorporated by reference herein in their entireties.

FIELD OF THE DISCLOSURE

Certain aspects of the present disclosure generally relate to wireless communications and, more particularly, to utilizing different timer values for switching from a multiple user (MU) mode to a single user (SU) mode for a wireless device with traffic to output for transmission.

DESCRIPTION OF RELATED ART

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects of the present disclosure provide an apparatus for wireless communications. The apparatus generally includes a processing system configured to generate a frame having an indication of multiple timer values for one or more wireless devices to be used for switching from a multiple user (MU) mode to a single user (SU) mode and a first interface for outputting the frame for transmission.

Certain aspects of the present disclosure provide an apparatus for wireless communications. The apparatus generally includes a first interface for obtaining a first frame having an indication of multiple timer values and a processing system configured to determine when to switch from a multiple user (MU) mode to a single user (SU) mode based on the multiple timer values and generate one or more second frames for transmission via at least one of the SU mode or the MU mode, based on the determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
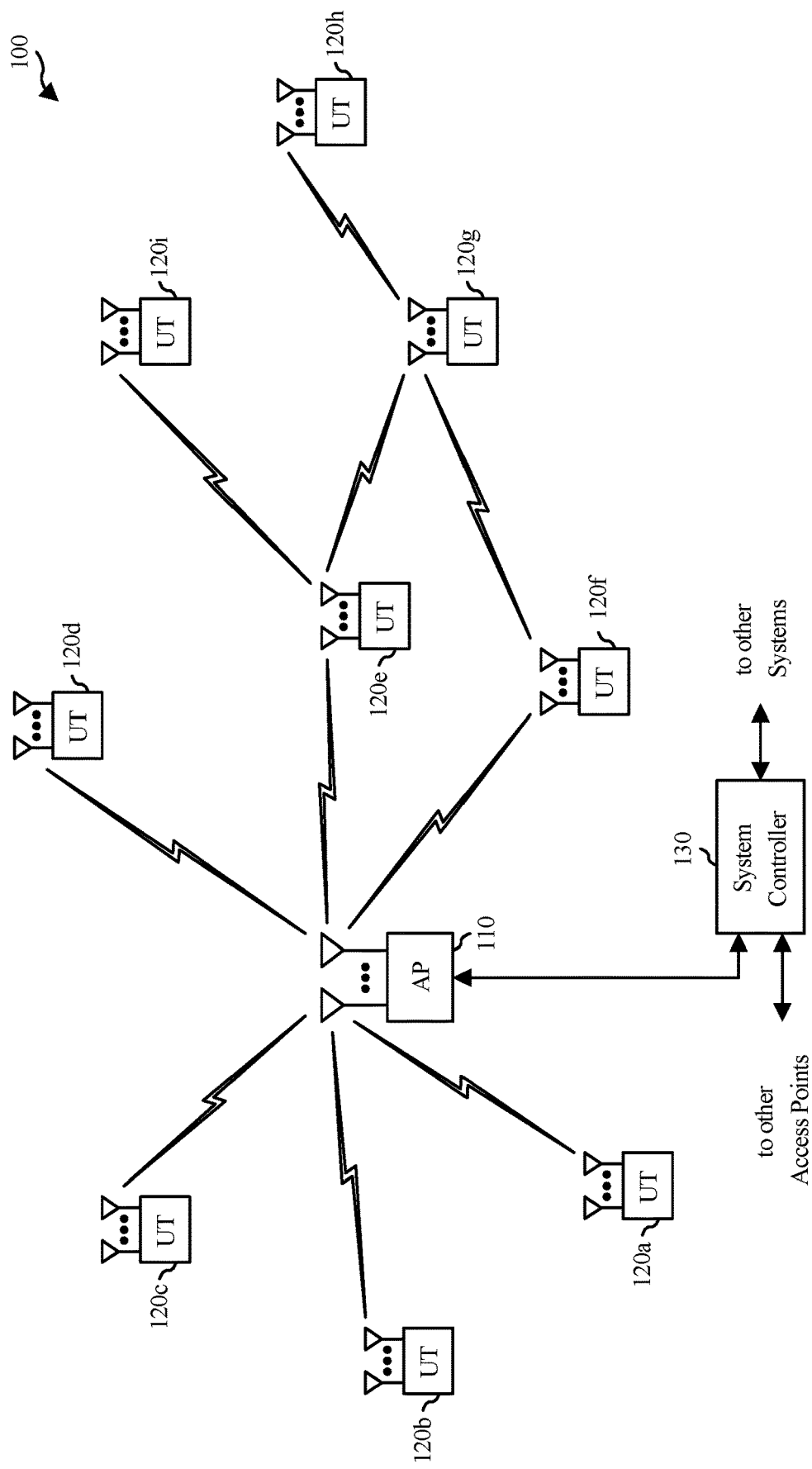
FIG. 1 illustrates an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to a different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communication System

FIG. 1 illustrates a system 100 in which aspects of the disclosure may be performed. For example, the user terminal 120e may send access point (AP) 110 an OBSS frame (e.g., a physical layer convergence protocol (PLCP) protocol data unit (PPDU)) having an indication that other STAs should perform SR according to a default mode instead of performing SR according a CCA level or interference level included in an SR information field of the OBSS frame. Recipient user terminals 120 (e.g., UT 120g) may determine, based on the indication, to perform SR according to the indicated default mode and may begin generating and transmitting a frame to other recipients (e.g., UT 120h) before the UT 120e completes transmitting of the OBSS frame.

The system 100 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
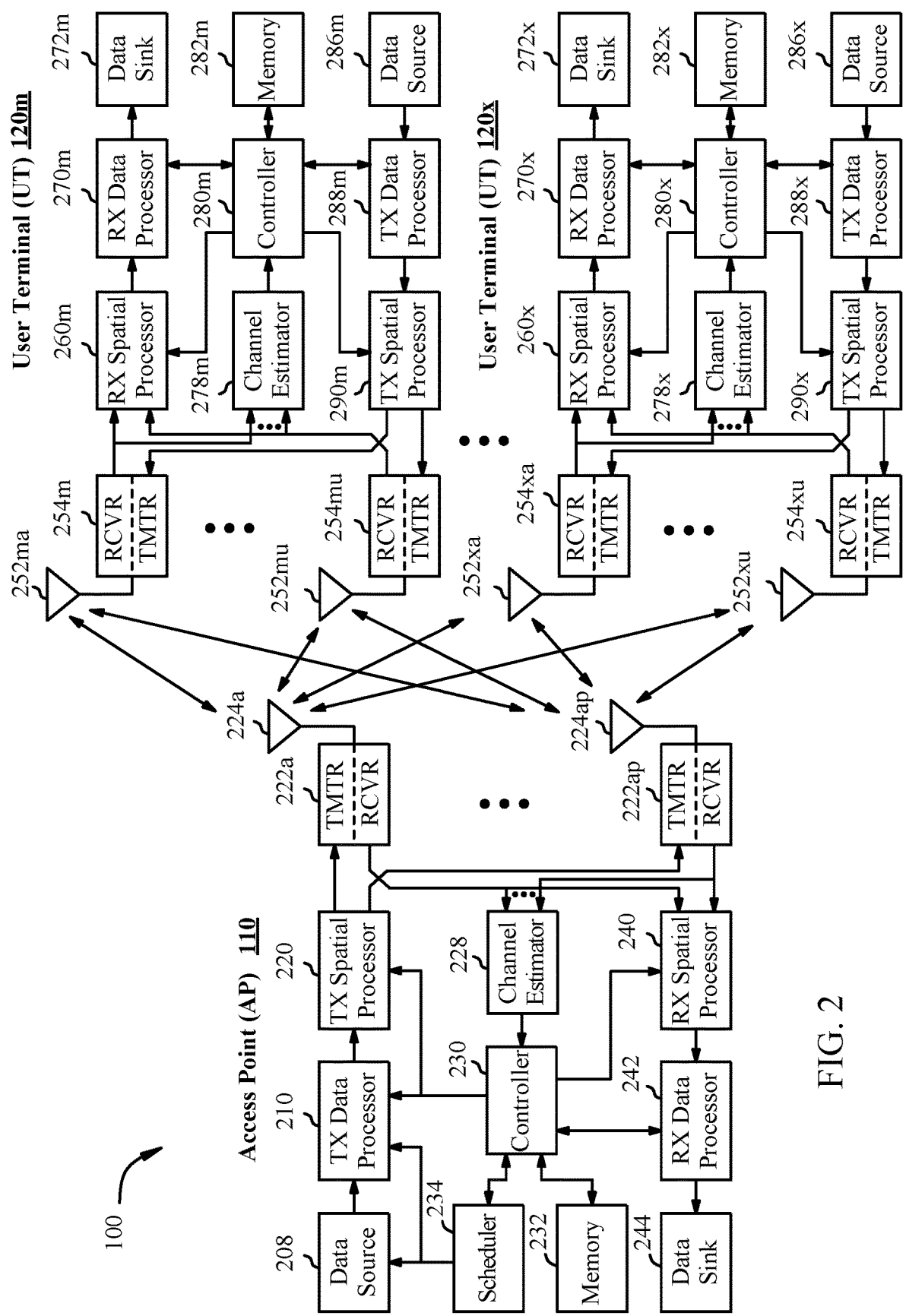
FIG. 2 is a block diagram of an example access point (AP) and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, transceiver unit 222, processors 210, 220, 240, 242, and/or controller 230 may be used to perform the operations described herein and illustrated with reference to FIGS. 5 and 5A. Similarly, antenna 252, transceiver unit 254, processors 260, 270, 288, and 290, and/or controller 280 may be used to perform the operations described herein and illustrated with reference to FIGS. 6 and 6A.

FIG. 2 illustrates a block diagram of access point 110 and two user terminals 120m and 120x in a MIMO system 100. The access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) of transceiver units 254 receives and processes (e.g., converts to analog, amplifies, filters, and frequency upconverts) a respective transmit symbol stream to generate an uplink signal. $N_{ut,m}$ transmitter units of respective transceiver units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) of transceiver units 222. Each receiver unit of transceiver units 222 performs processing complementary to that performed by transmitter unit of a transceiver unit 254 and provides a received symbol stream. An RX spatial processor 240 performs receiver spatial processing on the $N_{ap}$ received symbol streams from $N_{ap}$ receiver units of respective transceiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{ap}$ transmit symbol streams for the $N_{ap}$ antennas. Each transmitter unit of transceiver units 222 receives and processes a respective transmit symbol stream to generate a downlink signal. $N_{ap}$ transmitter units of respective transceiver units 222 provide $N_{ap}$ downlink signals for transmission from $N_{ap}$ antennas 224 to the user terminals. The decoded data for each user terminal may be provided to a data sink 272 for storage and/or a controller 280 for further processing.

At each user terminal 120, $N_{ut,m}$ antennas 252 receive the $N_{ap}$ downlink signals from access point 110. Each receiver unit of transceiver units 254 processes a received signal from an associated antenna 252 and provides a received symbol stream. An RX spatial processor 260 performs receiver spatial processing on $N_{ut,m}$ received symbol streams from $N_{ut,m}$ receiver units of respective transceiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
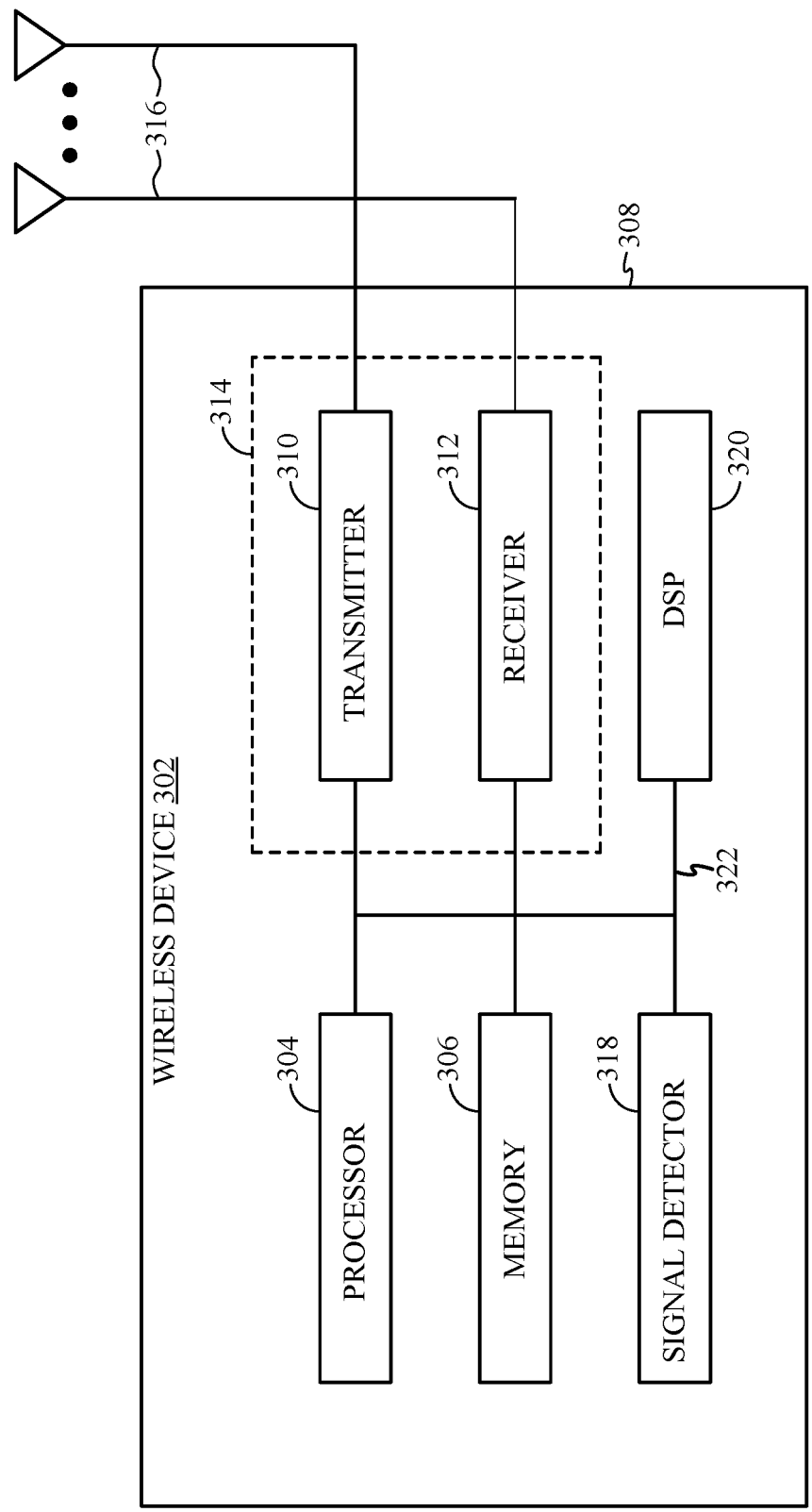
FIG. 3 is a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 500 and 600 illustrated in FIGS. 5 and 6, respectively. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In systems with many different applications and traffic, quality of service (QOS) capabilities may be provided to enhance performance by allocating resources among the different applications and traffic. QOS may be enhanced by one or more techniques. One such techniques includes enhanced distributed channel access (EDCA) which may be utilized to indicate what traffic should be handled at a higher or lower priority.

Example SU Switching Timer Per Access Category (AC)

In certain wireless standards (e.g., current 11*ax* spec draft), devices capable of sending traffic in a multiple user (MU) mode, so-called MU-capable STAs, typically switch from the MU mode to SU mode to more aggressively send UL traffic in Carrier Sense Multiple Access (CSMA) scenarios.

In some cases, a parameter referred to as an MU_EDCA_Timer (more generally referred to herein as an SU mode switching timer) controls switching to the SU mode. In conventional devices, if MU transmission(s) are not scheduled for a duration specified by this timer, the device switches to SU mode to allow the traffic to be sent more aggressively in SU mode.

MU capable STAs may not be scheduled due to various reasons. For example, an AP may have a large number of STAs to be scheduled, the AP may have an imperfect UL scheduling algorithm, and/or STAs may have newly arrived UL packets not known by AP. As used herein, the term "MU capable STA" may not include those STAs setting "UL MU Disable" bit as 1 in its operation mode indication control field sent in any frame to AP. Switching to SU or MU mode typically means a STA will update its EDCA parameters for all access categories (AC) as those for SU or MU mode. In addition, EDCA parameters for all ACs are typically set to allow more aggressive medium access in SU mode than in MU mode. An MU_EDCA_Timer is typically announced by the AP in MU EDCA parameter set element.

Figure 4:
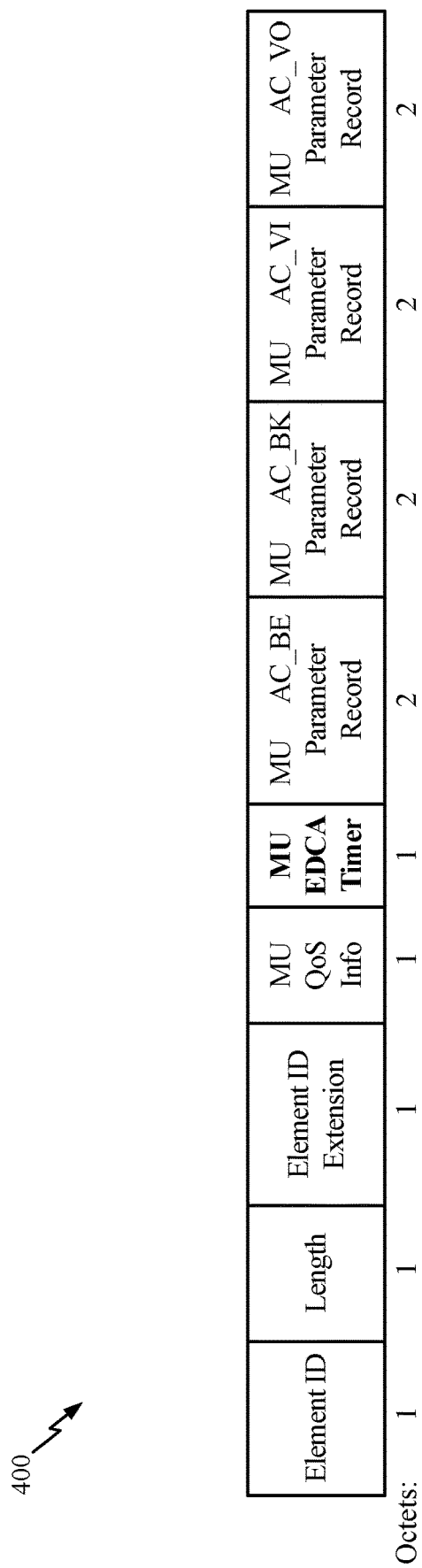
FIG. 4 illustrates an example multiple user (MU) Enhanced distributed channel access (EDCA) parameter set element.

For example, as illustrated in FIG. 4, in current MU EDCA set element 400, a single MU_EDCA_Timer value is common for all STAs, regardless of their QoS requirements. Unfortunately, this is sub-optimal. For example, if this common timer is too long, STAs with delay sensitive traffic will have to wait for the (overly) long timer period before sending UL traffic in SU mode. On the other hand, if the common timer is too short, STAs with delay tolerable traffic will unnecessarily switch to SU mode after the (overly) short timer expires, and this will degrade medium efficiency due to more SU mode transmissions.

Aspects of the present disclosure, however, may help address these shortcomings by providing multiple timer values (for MU_EDCA_Timers). For example, by providing a different timer value for each access category (AC), STAs with ACs for delay-sensitive traffic may use shorter timers for faster SU mode switching to reduce UL packet latency. STAs with ACs for more delay-tolerable traffic may use longer timers, which may result in less SU mode transmissions due to longer timer settings, a higher chance to be scheduled during the longer timer period, and more UL packet aggregation during the longer timer period.

Figure 5:
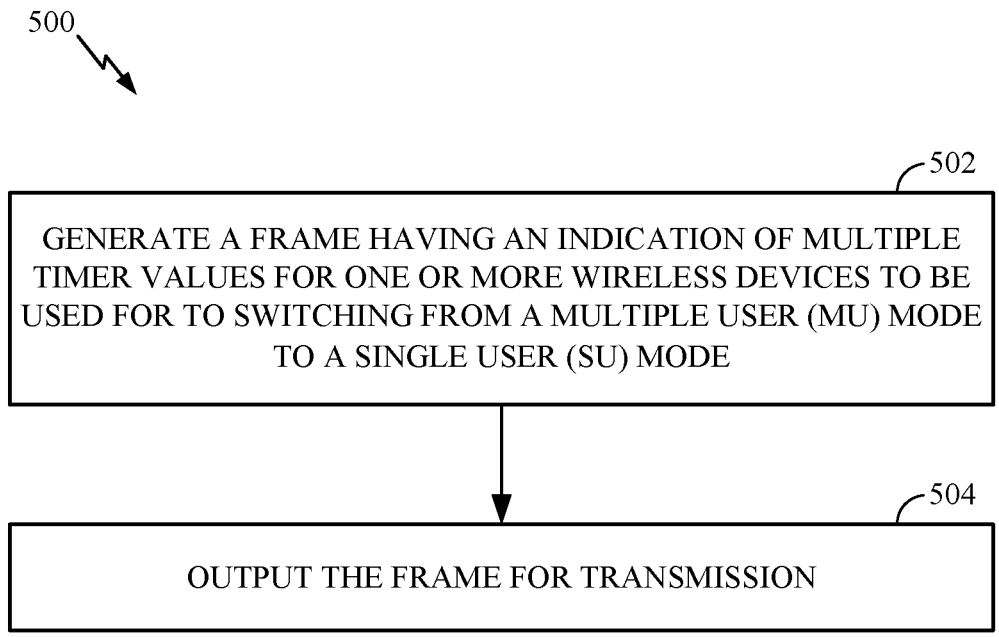
FIG. 5 illustrates example operations that may be performed by an access point (AP), according to aspects of the present discourse.
Figure 5A:
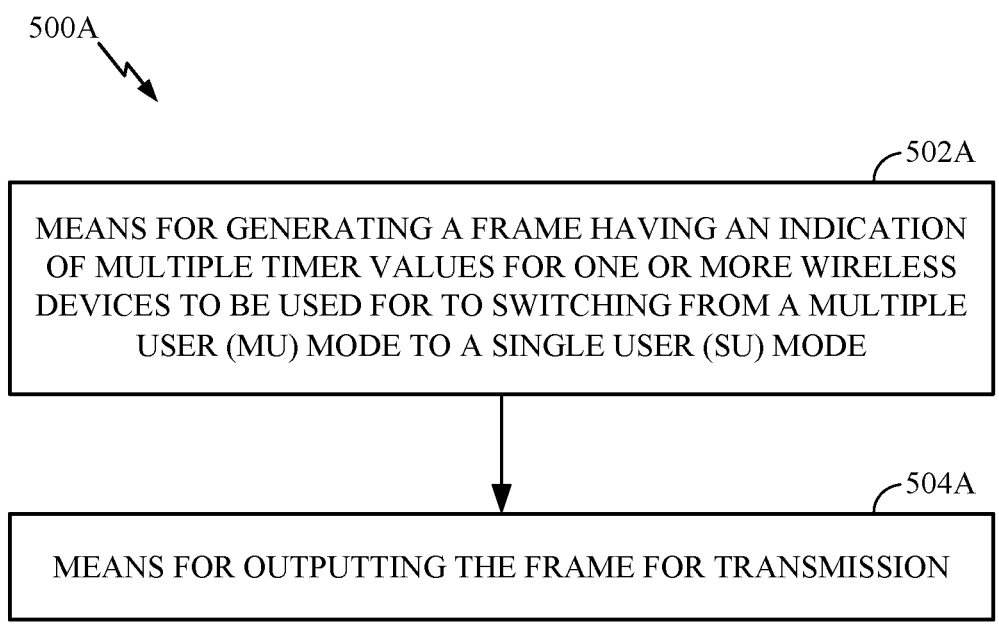
FIG. 5A illustrates example components capable of performing the operations shown in FIG. 5.

FIGS. 5 and 5A illustrate example operations 500 that may be performed by an access point (AP) and example means for implementing the operations 500A, respectively, according to aspects of the present discourse.

Operations 500 and associated means 500A begin, at 502 and 502A, by generating a frame having an indication of multiple timer values for one or more wireless devices to be used for switching from a multiple user (MU) mode to a single user (SU) mode. At 504 and 504A, the AP outputs the frame for transmission.

Figure 6:
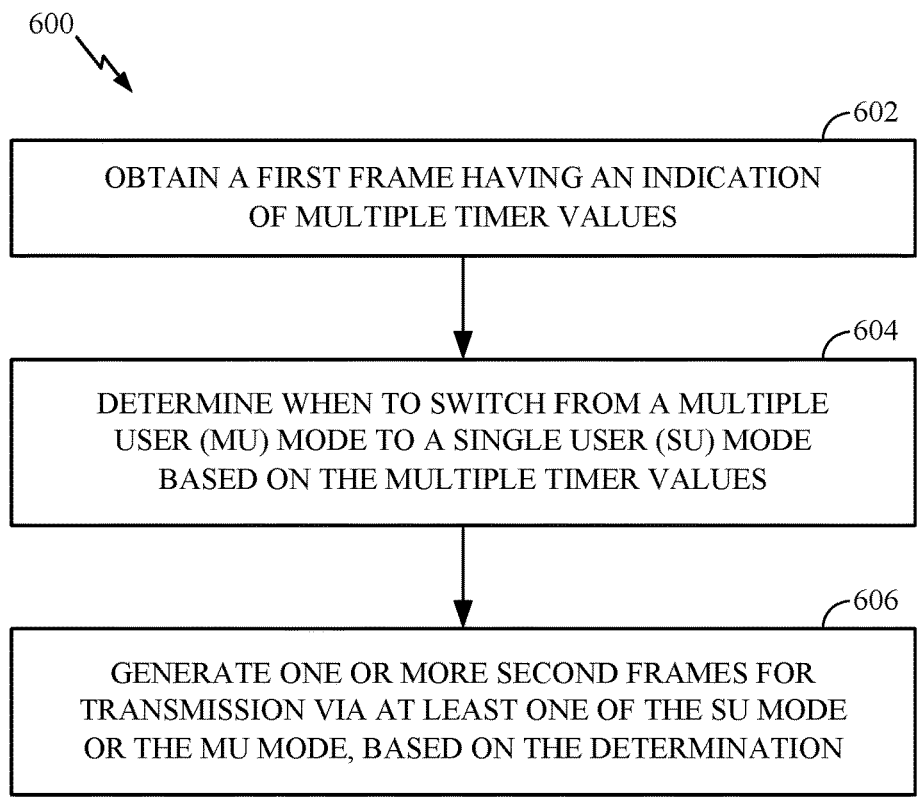
FIG. 6 illustrates example operations that may be performed by a wireless station, according to aspects of the present discourse.
Figure 6A:
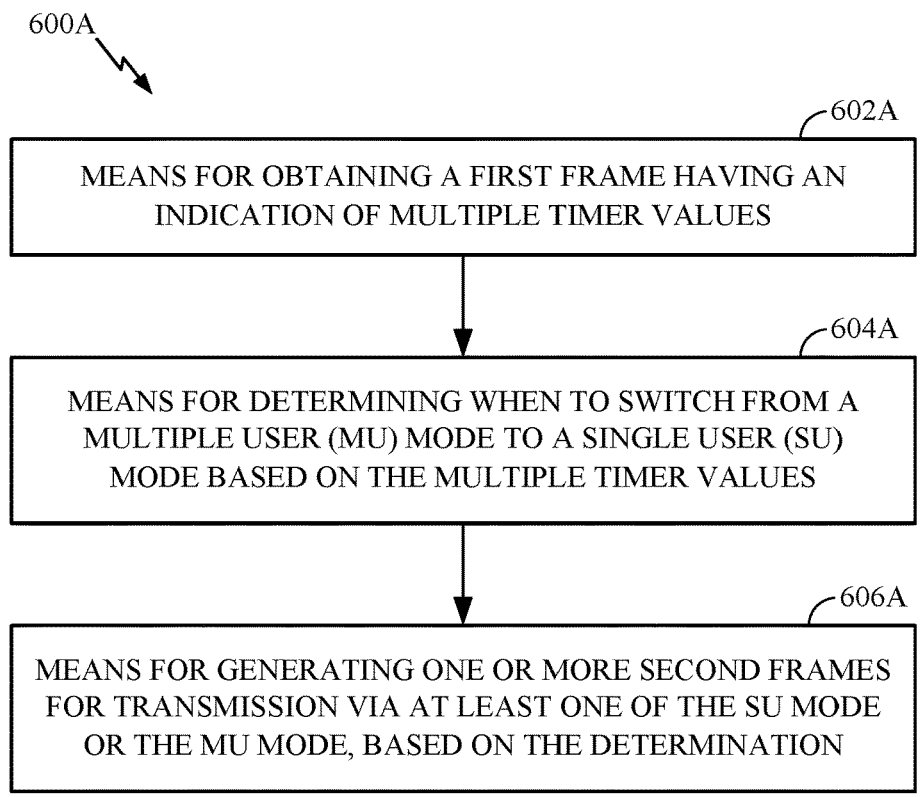
FIG. 6A illustrates example components capable of performing the operations shown in FIG. 6.

FIGS. 6 and 6A illustrate example operations 600 that may be performed by a wireless station and example means for implementing those operations 600A, according to aspects of the present discourse.

Operations 600 and associated means 600A begin, at 602 and 602A, by obtaining a first frame having an indication of multiple timer values. At 604 and 604A, the station determines when to switch from a multiple user (MU) mode to a single user (SU) mode based on the multiple timer values. At 606 and 606A, the station generates one or more second frames for transmission via at least one of the SU mode or the MU mode, based on the determination.

In some cases, rather than a single timer value (e.g., the common MU_EDCA_Timer), an AP may broadcast multiple timer values.

Figure 7:
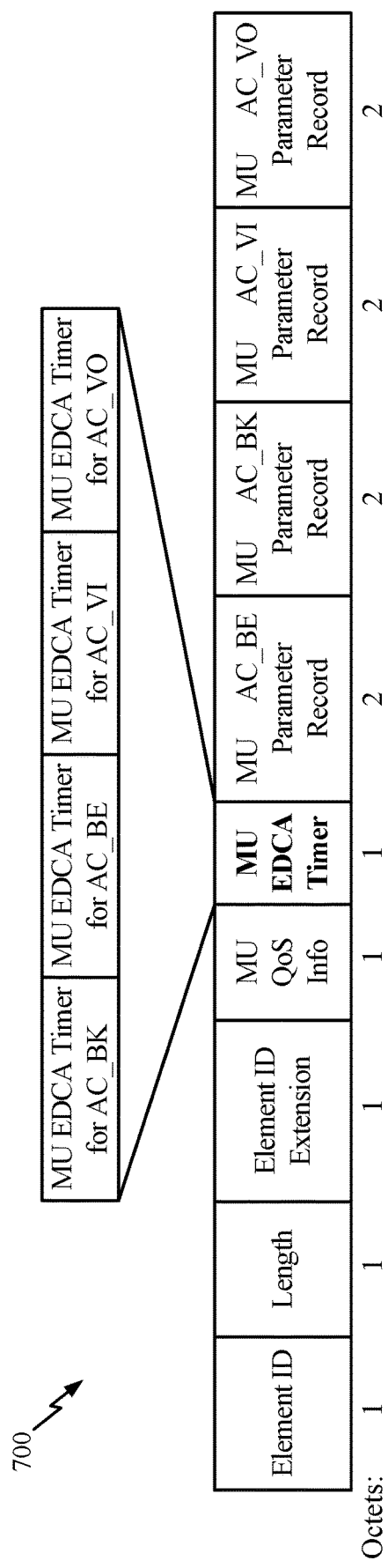
FIG. 7 illustrates an example multiple user (MU) Enhanced distributed channel access (EDCA) parameter set element, according to aspects of the present discourse.

For example, as illustrated in FIG. 7, the AP may broadcast a timer value per AC. In the illustrated example MU EDCA parameter set element 700, an MU_EDCA timer value is provided for background (AC_BK), best effort (AC_BE), video (AC_VI), and voice (AC_VO) ACs. The broadcast timer values may be selected according to delay tolerance of the corresponding AC. For example, the following example values in terms of time units (TUs) may be broadcast, in order of increasing delay tolerance:

AC_VO: 8 TUs (~8 ms),
AC_VI: 16 TUs (~16 ms),
AC_BE: 32 TUs (~32 ms),
AC_BK: 56 TUs (~56 ms)

A station receiving such multiple timer values (per AC) may have various options for using them to control switching from MU to SU mode. According to a first option, a STA may maintain a single timer. In this case, when getting scheduled, the STA may stay at or switch to MU mode, keep or update its EDCA parameters as those for operation in MU mode as announced by the AP in MU EDCA parameter set element, determine a highest priority AC among all STA's uplink traffic (UL TIDs), and set the single timer according to the AP broadcast timer value for this (highest) priority AC. More specifically, "getting scheduled" as used herein generally means a STA receives from the AP a basic variant trigger frame that contains a per user info field with the association ID of the STA, and receives an immediate response from the AP for the STA's transmitted trigger-based PPDU.

Using the example timer values shown above, a STA with video (VI) as the highest AC, would set the single timer as broadcast value for VI, 16 TUs. If not scheduled and this (single) timer counts down to 0, the STA would then switch to SU mode for all ACs (e.g., updating its EDCA parameters for all ACs as those for operation in SU mode as announced by the AP in MU EDCA parameter set element).

While this single-timer approach may have an advantage in simplicity (maintaining a single timer), this approach may be sub-optimal in some cases, such as when the STA has uplink traffic for multiple ACs. For example, if the STA has traffic identifiers (TIDs) for both VO and BK, it would set the single timer as the broadcast timer value for VO, when scheduled. But the STA may only have buffered data for BK when the single timer counts down to 0. In this case, the STA sends data for BK in SU mode after the short timer for VO expires, which may not be efficient, since data for BK can tolerate longer latency.

Therefore, according to a second option, a STA may keep multiple timers (e.g., associated with different ACs). According to this option, when getting scheduled, a STA may stay at or switch to MU mode and set each of the multiple (AC) timers according to the corresponding broadcast timer values. More specifically, "getting scheduled" as used herein generally means a STA receives from the AP a basic variant trigger frame that contains a per user info field with the association ID of the STA, and receives an immediate response from the AP for the STA's transmitted trigger-based PPDU.

If the STA is not scheduled and a corresponding AC timer counts down to 0, the STA will enter SU mode for this AC (e.g., using SU mode EDCA parameters for this AC). Again, assuming the values above for VO, VI, BE, BK (8, 16, 32, 56 TUs), if a STA is not scheduled for 8 TUs, the STA will enter SU mode only for VO. If not scheduled for 16 TUs, the STA will enter SU mode for VO and VI, and so on.

Advantages of this second approach may be seen by considering the same scenario discussed above, where a STA has TIDs for both VO and BK, but only has buffered data for BK when the timer for VO counts down to 0. Using multiple timers, the STA now will not send data for BK in SU mode, since only VO switches to SU mode.

Figure 8:
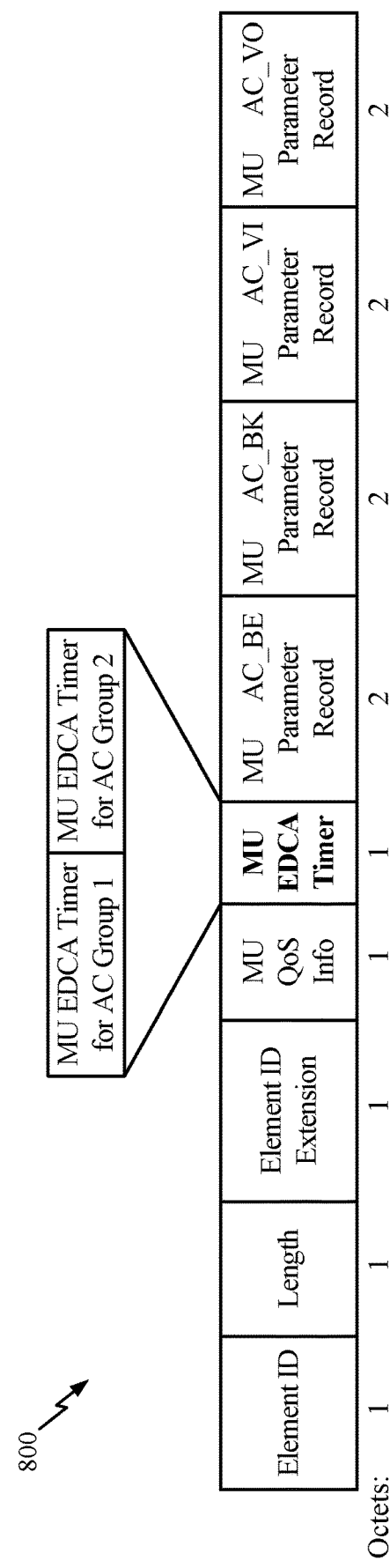
FIG. 8 illustrates an example multiple user (MU) Enhanced distributed channel access (EDCA) parameter set element, according to aspects of the present discourse.

In some cases, rather than broadcast a timer value per AC, an AP may broadcast a timer per group of ACs. FIG. 8 illustrates an example MU-EDCA parameter set element 800 with different timer values for different AC groups, according to aspects of the present discourse. The example shows timer values for two AC groups: AC group 1 and AC group 2. As an example, AC group 1 can include AC_VO and AC_VI (for delay sensitive traffics), while AC group 2 can include AC_BK and AC_BE (for more delay tolerable traffics). As an example, the timer per AC group could be:

AC group 1: 8 TUs (~8 ms)
AC group 2: 32 TUs (~32 ms)

A station receiving such multiple timer values (per AC group) may have various options for using them to control switching from MU to SU mode. According to a first option, a STA may maintain a single timer.

In this case, when getting scheduled, the STA may stay at or switch to MU mode, determine a highest priority AC among all uplink traffic (UL TIDs), and set the single timer according to the AP broadcast timer value for the AC group containing this AC. As an example, with VI as the highest AC (using the example timer values above), the STA will set the single timer to the value for AC group 1 (8 TUs). If not scheduled and timer counts down to 0, the STA will switch to SU mode for all ACs.

According to a second option, a STA may keep multiple (SU mode switching) timers (e.g., associated with different AC groups). According to this option, when scheduled, a STA may switch to MU mode and set each of the multiple (AC group) timers according to the corresponding broadcast timer values. Using the example numbers above, the STA may set timers for AC groups 1 and 2 as 8 and 32 TUs, respectively. If the STA is not scheduled and an AC group timer counts down to 0, the STA will enter SU mode for ACs contained in this group (e.g., using SU EDCA for those ACs).

In this manner, the use of multiple timer values may result in a STA not having to switch to the SU mode (at least for some traffic types). For example, a longer timer value for some traffic types (with more tolerable delay) may allow that traffic types to be sent in MU mode eventually (without switching to SU), while the STA switches to SU mode for other (less delay tolerant) traffic types.

Besides having a timer per AC or AC group, multiple timer values may be provided using other classification methods. For example, in some cases, different timer values may be used for different groups of stations. Such STA groups may be classified, for example, based on UL traffic QoS requirements (e.g., stations with delay sensitive or insensitive traffics grouped together). Other criteria may be used to classify stations into groups, such as grouping associated/unassociated STAs, STAs with large/small path loss to serving AP, or the like. If resources permit, one or more different timer values could be provided per STA.

In some cases, multiple timer values could be provided based on a frame type or sub-type. For example, a shorter timer value could be provided for transmitting control frame, while a longer timer value is provided for transmitting a data frame.

In some cases, multiple timer values could be provided based on the type of information. For example, a shorter timer value may be provided for frames carrying buffer status, sounding, or CQI feedback, while longer timer values may be provided for frames without such information.

When switching to SU mode, STAs may determine when or whether to use SU mode EDCA parameters for the AC. For example, the STAs may decide when to restart a backoff timer with SU mode EDCA parameters or when to use SU mode EDCA parameters after an ongoing backoff timer finishes for that AC. In some cases, when switching to SU mode for an AC, a STA may stop an ongoing backoff timer and restart the backoff timer with SU mode EDCA parameters for that AC. In other cases, when switching to SU mode for an AC, a STA may continue an ongoing backoff timer (e.g., wait until it expires) and (only) use (to initiate a timer) SU mode EDCA parameters for new backoff timers for that AC. In other cases, when switching to SU mode for an AC, a STA may dynamically determine whether to restart a backoff timer with SU mode EDCA parameters or to finish an ongoing backoff timer before using SU mode EDCA parameters to restart the backoff timer for the AC. For example, a STA may determine to continue an ongoing backoff timer if the backoff timer is almost finished, e.g., a remaining backoff time is below 10% of total backoff time (e.g., below a threshold time). In some cases, the STA may decide to restart a backoff timer if the ongoing backoff timer is not almost finished, e.g., a remaining backoff time is equal to or greater than 10% of total backoff time (e.g., equal to or greater than the threshold time).

In another aspect, a STA may stay in the SU mode for all ACs and use SU mode EDCA parameters for pre-association communications with an AP. For example, STA should use SU mode EDCA parameters to send probe or association request to AP before receiving association response or assigned association ID.

In another aspect, a STA may stay in the SU mode and use SU mode EDCA parameters after association with an AP but before being scheduled by the AP. For example, "scheduled by the AP" here means STA receives from the AP a basic variant trigger frame that contains a per user info field with the association ID (AID) of the STA, and receives an immediate response from the AP for the STA's transmitted trigger-based PPDU.

In another aspect, a STA may set all of its SU mode switching timers as 0 (e.g., clear all of the SU mode switching timers) if it is in SU mode.

In another aspect, when STA enters a power mode where a component of the STA is powered down (e.g., a sleep mode), the STA may have the following options to maintain the SU mode switching timers of the STA. Option 1: STA halts or freezes all timers when entering the power mode (e.g., a sleep mode) and resumes the countdown of all timers when the STA exits or leaves the power mode (e.g., leaves the sleep mode). Option 2: STA clears all timers, such as by stopping all timers when entering the power mode (e.g., a sleep mode) and setting the timers as 0 when the STA exits or leaves the power mode (e.g., leaves the sleep mode). Option 3: STA continues to count down all timers after entering the power mode (e.g., sleep mode) and stops the timers individually if they become 0.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

For example, means for receiving, means for obtaining, and means for communicating may be a receiver (e.g., the receiver unit of transceiver unit 254) and/or an antenna(s) 252 of the user terminal 120 illustrated in FIG. 2, the receiver (e.g., the receiver unit of transceiver unit 222)

and/or antenna(s) 224 of access point 110 illustrated in FIG. 2, or the receiver 312, antennas 316, and/or the bus system 322 illustrated in FIG. 3. Means for transmitting may be a transmitter (e.g., the transmitter unit of transceiver unit 254) and/or an antenna(s) 252 of the user terminal 120 illustrated in FIG. 2, the transmitter (e.g., the transmitter unit of transceiver unit 222) and/or antenna(s) 224 of access point 110 illustrated in FIG. 2, or the transmitter 310, antennas 316, and/or the bus system 322 illustrated in FIG. 3. Means for outputting may also be a transmitter or may be a bus interface, for example, to output a frame from a processor to an RF front end for transmission.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

Means for processing, means for adapting, means for performing, means for generating, means for obtaining, means for determining, means for identifying, means for classifying, means for setting, means for halting, means for resuming, means for clearing, means for continuing, means for clearing, means for switching, means for using, means for remaining, means for restarting, means for waiting, and means for outputting may comprise a processing system, which may include one or more processors, such as the RX data processor 270, the TX data processor 288, and/or the controller 280 of the user terminal 120 illustrated in FIG. 2 or the TX data processor 210, RX data processor 242, and/or the controller 230 of the access point 110 illustrated in FIG. 2.

According to certain aspects, such means may be implemented by processing systems configured to perform the corresponding functions by implementing various algorithms (e.g., in hardware or by executing software instructions) described above for signaling at least one of adapting and performing channel access based on SR parameters and SR levels.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a processing system configured to generate a frame having an indication of multiple timer values for one or more wireless devices to be used for switching from a multiple user (MU) mode to a single user (SU) mode, wherein the multiple timer values comprise different timer values for different access categories (ACs) of an MU enhanced distributed channel access (EDCA) parameter set element included in the frame; and
    an interface for outputting the frame for transmission.

2. The apparatus of claim 1, wherein:
    each of the multiple timer values corresponds to a duration after which the wireless devices should switch from the MU mode to the SU mode, for a corresponding AC, if not scheduled for transmission for that corresponding AC.

3. The apparatus of claim 2, wherein each of the different timer values is based on delay tolerance of a corresponding AC.

4. The apparatus of claim 1, wherein the multiple timer values comprise:
    a first timer value for a first group of at least two access categories; and
    a second timer value for a second group of at least one access category.

5. The apparatus of claim 1, wherein the multiple timer values comprise:
    a first timer value for at least one of a Video AC or a Voice AC; and
    a second timer value, longer than the first timer value, for at least one of a Background AC or a Best Effort AC.

6. The apparatus of claim 1, wherein the multiple timer values comprise:
    a first timer value for a first group of the one or more wireless devices; and
    a second timer value for a second group of the one or more wireless devices.

7. The apparatus of claim 6, wherein the processing system is configured to:
    classify wireless devices in the first group based on first quality of service (QoS) requirements of traffic to be output for transmission from the first group of wireless devices; and
    classify wireless devices in the second group based on second QoS requirements of traffic to be output for transmission from the second group of wireless devices.

8. The apparatus of claim 1, wherein the multiple timer values comprise:
    a first timer value for a first type of frame to be output for transmission from the one or more wireless devices; and
    a second timer value for a second type of frame to be output for transmission from the one or more wireless devices.

9. The apparatus of claim 1, wherein the multiple timer values comprise:
    a first timer value for a first type of information to be output for transmission from the one or more wireless devices; and
    a second timer value for a second type of information to be output for transmission from the one or more wireless devices.

10. An apparatus for wireless communications, comprising:
    an interface for obtaining a first frame having an indication of different timer values for different access categories (ACs) of a multiple user (MU) enhanced distributed channel access (EDCA) parameter set element included in the first frame; and
    a processing system configured to:
        determine when to switch from the MU mode to a single user (SU) mode based on the multiple timer values, and
        generate one or more second frames for transmission via at least one of the SU mode or the MU mode, based on the determination.

11. The apparatus of claim 10, wherein:
    each of the multiple timer values corresponds to a duration after which the apparatus should switch from the MU mode to the SU mode, for a corresponding AC, if not scheduled for transmission for that corresponding AC.

12. The apparatus of claim 10, wherein the multiple timer values comprise:
a first timer value for a first group of at least two access categories; and
a second timer value for a second group of at least one access category.

13. The apparatus of claim 10, wherein the multiple timer values comprise:
a first timer value for at least one of a Video AC or a Voice AC; and
a second timer value, longer than the first timer value, for at least one of a Background AC or a Best Effort AC.

14. The apparatus of claim 10, wherein the processing system is configured to:
identify a highest priority AC for traffic to be output for transmission; and
set a single timer used to control switching from the MU mode to the SU mode based on a timer value for the highest priority AC.

15. The apparatus of claim 10, wherein the processing system is configured to:
identify ACs for different traffic to be output for transmission; and
set different timers used to individually control switching from the MU mode to the SU mode for different ACs based on timer values for the identified ACs.

16. The apparatus of claim 10, wherein:
the multiple timer values comprise a first timer value for a first group of one or more wireless devices and a second timer value for a second group of one or more wireless devices; and
the processing system is configured to use the first timer value or the second timer value depending on whether the apparatus is in the first group or the second group.

17. The apparatus of claim 10, wherein the multiple timer values comprise:
a first timer value for a first type of frame to be output for transmission from the apparatus; and
a second timer value for a second type of frame to be output for transmission from the apparatus.

18. The apparatus of claim 10, wherein the multiple timer values comprise:
a first timer value for a first type of information to be output for transmission from the apparatus; and
a second timer value for a second type of information to be output for transmission from the apparatus.

19. An apparatus for wireless communications, comprising:
an interface for obtaining a first frame indicating single user (SU) enhanced distributed channel access (EDCA) parameters for at least a first access category (AC) and a second frame having an indication of timer values for different ACs of multiple user (MU) EDCA parameters; and
a processing system configured to:
switch from an MU mode to an SU mode based on the timer values;
determine, while in the SU mode for the first AC, at least one of when or whether to use the SU EDCA parameters for the first AC, and
generate one or more third frames of the first AC for transmission via the SU mode, based on the determination.

20. The apparatus of claim 19, wherein the processing system is configured to:
use the SU EDCA parameters while remaining in the SU mode for the first AC for pre-association communications.

21. The apparatus of claim 19, wherein the processing system is configured to:
remain in the SU mode for a plurality of ACs including the first AC, and use the SU EDCA parameters for the plurality of ACs for pre-association communications.

22. The apparatus of claim 19, wherein the processing system is configured to:
remain in the SU mode for the first AC and use the SU EDCA parameters for the first AC after the apparatus had performed association with an access point (AP); and
switch to the MU mode for the first AC after the apparatus has received a trigger from the AP to send MU data.

23. An apparatus for wireless communications, comprising:
an interface for obtaining a frame having an indication of different timer values for different access categories (ACs) of a multiple user (MU) enhanced distributed channel access (EDCA) parameter set element included in the frame; and
a processing system configured to:
initiate a timer used for switching from a MU mode to a single user (SU) mode based on at least one timer value of the different timer values, and
maintain the timer upon at least one of entering or exiting a first power mode in which one or more components of the apparatus are powered down.

24. The apparatus of claim 23, wherein the processing system is configured to maintain the timer by:
halting the timer while in the first power mode; and
resuming the timer upon exiting the first power mode.

25. The apparatus of claim 23, wherein the processing system is configured to maintain the timer by:
clearing the timer when exiting the first power mode.

26. The apparatus of claim 23, wherein the processing system is configured to maintain the timer by:
continuing to count down the timer while in the first power mode.

27. The apparatus of claim 23, wherein the processing system is configured to:
clear the timer while in the SU mode.

28. The apparatus of claim 19, wherein the processing system is configured to:
restart a backoff timer for the first AC, that was stopped after the apparatus had entered the SU mode, based on the SU EDCA parameters for the first AC.

29. The apparatus of claim 19, wherein the processing system is configured to:
wait until an ongoing backoff timer for the first AC expires and, when the backoff timer expires, restart the backoff timer based on the SU EDCA parameters for the first AC.

30. The apparatus of claim 19, wherein the processing system is configured to:
restart an ongoing backoff timer for the first AC, based on the SU EDCA parameters, if an amount of time remaining before expiration of the backoff timer is greater than or equal to a threshold time.

* * * * *